April 14, 1964 H. LUDWIG 3,128,505
APPARATUS FOR INJECTION MOLDING OF PLASTICS
ARTICLES, ESPECIALLY SHOES
Filed Oct. 11, 1961 2 Sheets-Sheet 1

Inventor:
Herbert Ludwig
by Michael S. Striker
Attorney

April 14, 1964  H. LUDWIG  3,128,505
APPARATUS FOR INJECTION MOLDING OF PLASTICS
ARTICLES, ESPECIALLY SHOES
Filed Oct. 11, 1961  2 Sheets-Sheet 2
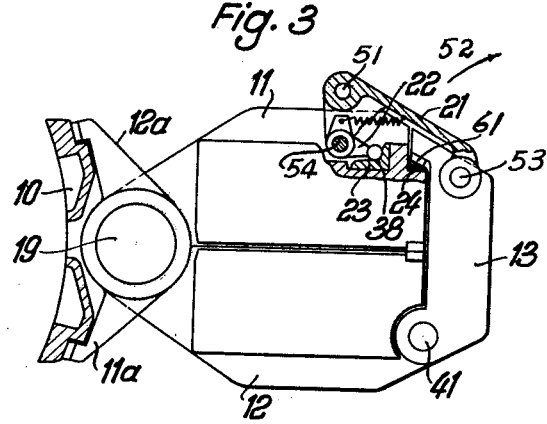
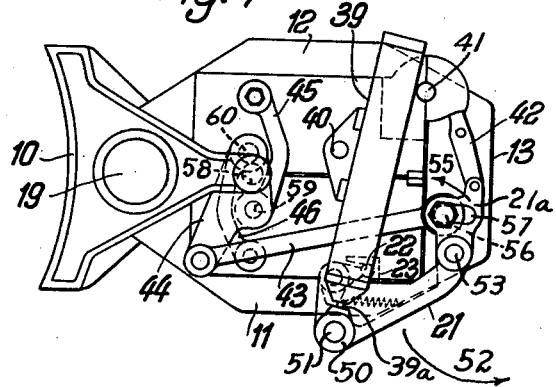
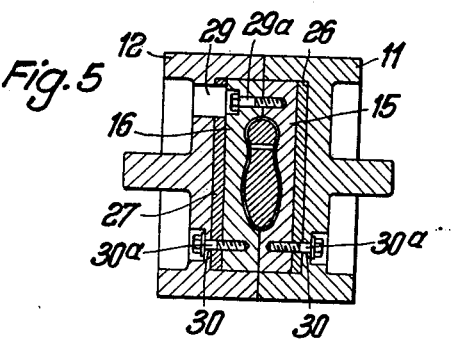
Inventor:
Herbert Ludwig
by Michael S. Striker
Attorney United States Patent Office 3,128,505
Patented Apr. 14, 1964

3,128,505
APPARATUS FOR INJECTION MOLDING OF PLASTICS ARTICLES, ESPECIALLY SHOES
Herbert Ludwig, Desmastrasse 112,
Uesen, near Bremen, Germany
Filed Oct. 11, 1961, Ser. No. 144,486
Claims priority, application Germany Oct. 17, 1960
8 Claims. (Cl. 18—42)

The present invention relates to an apparatus for injection-molding of plastics of any kind, especially shoes, which comprises a support means, two lateral mold supporting members pivotally connected to the support means, a cover hinged to one of these members, a core receiving member into which a core may be inserted, and an injection head.

The main disadvantage of known apparatus in this field is the fact that, if it is made of small dimensions with relatively short guiding means for the core, the core cannot be properly centered relative to the mold since the centering surfaces are constantly subjected to wear. This results in uneven and inaccurate wall thicknesses of the plastic during the injection thereof. These known apparatus also reveal additional deficiencies which are due to the fact that the centering surfaces are easily soiled by residues of plastic or of fiber inserts which are applied during the injection. Thus, a proper centering of the core during the injection process may often not be attained for several reasons.

A further disadvantage of known apparatus in which the mold halves swivel about horizontal axes is the fact that considerable forces are required for opening and closing the mold support since the heavy weight of one lateral mold supporting member together with the weight of the mold and the core therein, as well as of the cover has to be raised and lowered. In addition, it is necessary for these operations to manipulate two separate elements for moving the lateral mold supporting member and the cover.

It is an object of the present invention to overcome the above-mentioned disadvantages of known apparatus, especially for the manufacture of shoes, boots, and the like made of plastics, and to improve these apparatus considerably.

More particularly, it is an object of the invention to attain an accurate centering of the core relative to the mold and to prevent unnecessary wear of the centering surfaces regardless of whether the apparatus is large or small.

A further object of the invention is to provide an apparatus of the mentioned type in which a divided core, for example, a shoe last, may be used which is operated automatically, and which is designed to facilitate the removal of the molded article, for example, a shoe, from the core or last. The application of a divided last is not possible in any of the known apparatus.

The above-mentioned objects are attained according to the invention by providing a molding apparatus in which the mold supporting or receiving members are adapted to be closed upon a stationary core which is rigidly connected to its own supporting member, that is, the core receiving member, and by providing the two lateral mold supporting members with contact or stop members which in the closed position of these supporting members engage with corresponding stationary stop surfaces so as then to maintain these supporting members in a fixed position relative to the stationary core.

By providing the molding apparatus according to the invention with the above-mentioned features, it is possible, even though the apparatus is made of a short length and provided with relative short guiding means for the core, to center the core very accurately relative to the mold so that the walls of the article which is produced by injection molding will always have the exact thicknesses which are desired. The apparatus according to the invention has the further advantages over known apparatus that the centering surfaces will not be worn and that these surfaces will also not become soiled. Furthermore, the inventive design of the apparatus permits the use of a divided core which, although known as such, could not be applied in the previous apparatus of this type. According to a preferred embodiment of the invention, this divided core may be actuated by means of a piston, the axis of which intersects with the main swivel axis of the apparatus. The combination of all of these features results in the advantages which are usually attainable by the use of a divided core, and further in a very simple construction of such a core and the fact that this divided core may be very easily inserted and removed as well as exchanged for a similar core.

Contrary to known apparatus in which special pressure exerting means have to be provided for locking the apparatus in the closed position for the injection of the plastics, the present invention further provides automatic locking means consisting of a toggle-lever lock which is mounted on the cover which is pivotably mounted on one of the lateral mold supporting members and is operatively associated with a counterpart on the other lateral mold supporting member for closing the cover. The cover then also presses with an inclined surface upon the latter mold supporting member and thereby closes the two lateral mold supporting members firmly about the core.

In connection with the last-mentioned feature of the invention it is also of advantage to design the apparatus so that the movements of the individual mold supporting members and those of the toggle lever are positively connected. In this manner it is possible to carry out all movements of the mold support by means of a single driving means, preferably a hydraulic piston. A further advantage which is thus attained is the fact that all movable members of the apparatus will in any position thereof be in a fixed relation to each other and to the core.

Another preferred feature of the apparatus according to the invention is the fact that the main swivel axis of the mold support extends in a perpendicular direction. This has the advantage that the main work piston only has to overcome the friction which occurs by pivoting the individual members, and that it does not also have to lift and lower any heavy parts as in the known apparatus which would require this piston to overcome considerable forces.

The above-mentioned as well as still further objects, features, and advantages of the present invention will become more clearly apparent from the following detailed description of one preferred embodiment thereof as illustrated diagrammatically in the accompanying drawings, in which:

FIGURE 3 shows a top view, partly in section, of the mold support in the closed position;

FIGURE 4 shows a bottom view of the mold support in the closed position; while

FIGURE 5 shows a cross section of the mold support in the closed position.

Figure 1:
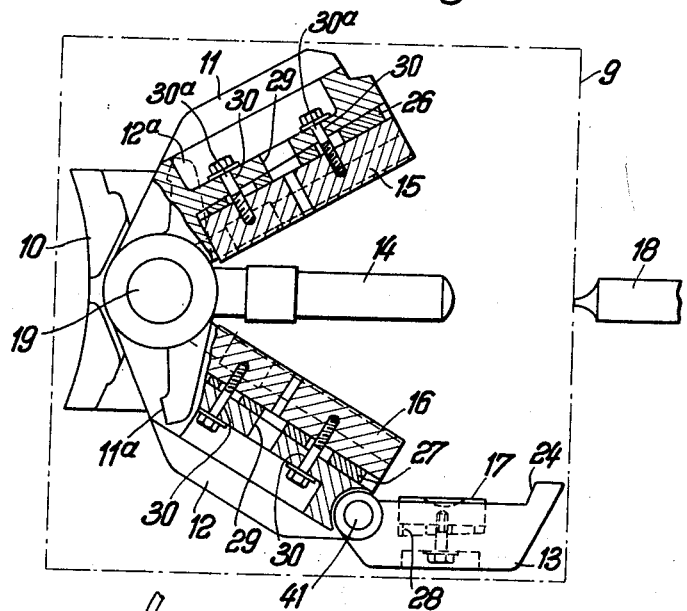
FIGURE 1 shows a top view, partly in section, of the apparatus according to the invention.

The apparatus according to the invention consists primarily of a mold support 9 and an injection head 18. The mold support 9 consists of several members 10, 11, 12, and 13 which are pivotably connected to each other. The core 14 of the mold is adapted to be inserted into and rigidly secured to the stationary member 10 which is therefore called the core receiving member, while the mold parts 15, 16, and 17 are adapted to be connected to the members 11 to 13 which are therefore called the mold receiving members. These members 11 to 13 are thus adapted to be pivoted relative to the stationary core 14 and their mold parts 15 to 17 may be closed around core 14. The two lateral mold supporting members 11 and 12 are provided with stop or contact projections 11a and 12a which, when the mold is closed, engage against stationary surfaces on the supporting member 10 and then insure that the mold receiving surfaces of members 11 and 12 extend parallel to the axis of core 14.

Figure 2:
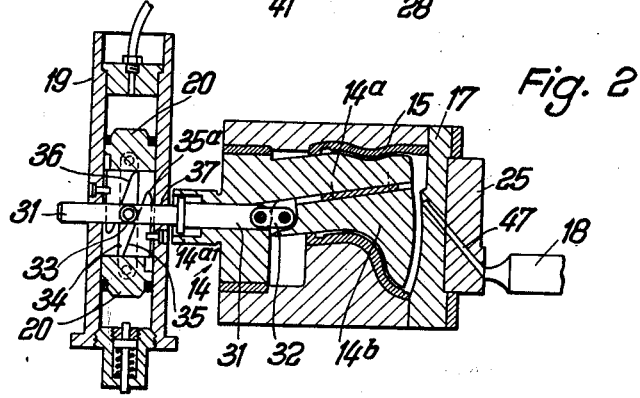
FIGURE 2 shows a longitudinal section of a divided core in the form of a shoe last, and of the main swivel shaft and work piston, but without the mold supporting members.

The apparatus may be used for injection molding of plastics articles of any kind, and the particular embodiment as illustrated in the drawings is intended for molding shoes of plastic. For this purpose, as illustrated in FIGURE 2, core 14 is provided in the shape of a divided shoe last which consists of an upper rear part 14a and a lower front part 14b. The rear part 14a has a projection 14a₁ which is rigidly connected to the stationary supporting member 10 so that core 14 is likewise mounted in a stationary position in the apparatus. This rigid connection may be attained, for example, by means of inclined surfaces and clamping bolts.

The front part 14b is slidable in a conventional manner along the rear part 14a and it is connected by a toggle joint 32 to a thrust rod 31 which is provided on its free end with guide rollers 33.

The tubular main shaft 19 contains a hydraulic piston 20 which is preferably divided and the two parts of which are connected to each other by connecting rods 34. Each of the two piston parts is provided with inclined guide surfaces 35 and 36 between which the guide rollers 33 on thrust rod 31 are engaged. The assembly of these parts of the apparatus is carried out by lowering the divided piston 20 to its lower dead center position. Thrust rod 31 may then be inserted through a bore 37 in the main shaft 19, whereupon the guide rollers 33 may be passed over the upper edge 35a of the inclined guide surface 35 of the lower piston part 20 until they engage with the inclined guide surface 36 of the upper piston part 20. When the divided piston is then moved upwardly, the guide rollers 33 will be guided between both guide surfaces 35 and 36. By an actuation of piston 20 it is therefore possible to shift the front part 14b of the last relative to the rear part 14a thereof. This particular type of actuation of the divided last as above described also permits the last to be easily exchanged.

Cover 13 which is pivotably mounted on the lateral mold supporting member 12, as shown particularly in FIGURES 3 and 4, is provided with a toggle-lever or bellcrank lock 21, 22 which cooperates with a ball-and-socket joint 23 to close the cover 13. Cover 13 then presses with an inclined surface 24 upon the lateral mold supporting member 11 and thereby closes the two lateral members 11 and 12 tightly around the core 14. In this closed position, the locking member 38 of the toggle-lever lock 21, 22 exceeds its dead-center position so that an automatic locking action is attained. The two lateral members 11 and 12 are closed by the toggle-lever lock 21, 22 and cover 13 including its inclined surface 24 with an initial tension which corresponds to the internal pressure which is subsequently produced by the injection. This initial tension is also maintained during the entire cooling period, that is, even during a revolution of the mold support 9 if, for example, several mold supports 9 are provided and successive injections are carried out by the injection head 18 at predetermined time intervals.

The operation of opening and closing the cover 13 and the lateral mold supporting members 11 and 12 is effected by means of a hydraulic piston 39 which is pivotably mounted on the lateral member 12 by means of a pivot pin 40. This lateral member 12 also pivotably supports the cover 13 by means of a pivot pin 41. The hydraulic piston 39 acts upon the toggle-lever lock 21, 22, the movements of which are, in turn, transmitted through levers 42, 43, 44, 45, and 46 to the cover 13 and to the two lateral members 11 and 12. Levers 42 to 46 act upon each other in such a manner that the individual mold supporting members 11 to 13 including the toggle levers 21 and 22 carry out positive movements. The various levers are associated with each other in such a manner that, when the mold support is being opened, at first the toggle-lever lock 21, 22 is released and then the cover 13 is opened, and that only thereafter the lateral mold supporting members 11 and 12 are pivoted apart. More specifically the hydraulic piston 39 includes a piston rod 39a, pivotally connected by means of an eye 50 to a pivot pin 51 fixed to the lever 21 which in turn is pivotally mounted by means of a pivot pin 53 fixed to the cover 13. Therefore, when pressure fluid is fed in a well known manner into the piston means 39, the piston rod 39a will be extended outwardly of the piston means 39 to turn thereby the lever 21 about its pivot pin 53 in the direction of the arrow 52 shown in FIGS. 3 and 4. When the lever 21 is turned in the direction of the arrow 52 about the pivot pin 53 it will be seen that the small lever 22 which is pivotally connected to a portion of the lever 21 by the pivot pin 54 will be taken along and turned at the same time so that the locking member 38 fixed to the end of the lever 22 will be lifted from its counterpart 23 fixed to the member 11.

The lever 21 is a double-armed lever and the arm 21a extending beyond the pivot pin 53 is formed with an elongated slot 57 in which a pin 56 fixed to one end of the lever 43 is slidably mounted. The lever 43 is therefore not moved by the double-armed lever 21, 21a during the first part of the opening movement of the cover 13, since the pin 56 can slide in the elongated slot 57 formed in the arm 28. Only after the cover is opened to such an extent that the portion 61 thereof will also be completely disengaged from the abutment surface 24 on member 11, the lever 43 will be taken along by the lever arm 21 so that the lever 44, which is pivotally connected by means of the pivot pin 58 to the stationary support member 10, will be turned about its pivot pin 58 in counterclockwise direction. This turning of the lever 44 is transmitted through levers 45 and 46 which are respectively turnably connected at one end thereof at 59 and 60 to lever 44 and at the other ends thereof to the members 11 and 12 so that the turning movement of the lever 44 in counterclockwise direction will cause turning of the mold supporting members 11 and 12 about the shaft 19 in mold opening direction.

The above described movement of various members shown in FIGS. 3 and 4 will occur in opposite direction during retraction of the piston rod 39a into the piston means 39. It should be noted that the small lever 22 which carries the locking member 38 as shown in FIG. 3 forms a toggle-lever mechanism with the arm of the lever 21 carrying the pivot pin 54 and in the locking position as shown in FIG. 3, the lever 21 is moved beyond the dead center position.

For the operations of opening and closing the mold support 9 it is also possible to provide not only a hydraulic piston 39 underneath the mold support but also a second hydraulic piston parallel to the first piston above the mold support.

As illustrated in the drawings, the main shaft 19 and the pivot pin 41 of cover 13 are preferably mounted in a perpendicular position so that the weight of members 11 to 13 will be taken up by these pivots. The hydraulic piston 39 may be of relatively small dimensions since it only has to overcome the friction which occurs during the opening and closing movements of the mold supporting members.

The mold supporting members 11 to 13 are provided with adjustable wedges 26, 27, and 28 with large outer surfaces for shifting the mold parts 15 to 17 in parallel directions whereby inaccuracies in the molding operation may be compensated. The mold parts 15 to 17 may thus be easily adjusted relative to the stationary core 14, for example, to compensate for wear.

The mold supporting members 10 to 13 which are associated with core 14 and mold parts 15 to 17 are provided with apertures 29 and 30. Core 14 and mold parts 15 to 17 are preferably installed in the apparatus after being bolted together. For this purpose, the mold support 9 is closed around the mold which is bolted together by bolts 29a and thereupon core 14 and mold parts 15 to 17 together with the associated mold supporting members 10 to 13 are bolted together by means of bolts 30a which are inserted into the apertures 30. After the different members and parts have been properly aligned and assembled, bolts 29a are loosened and removed from apertures 29. In this manner it is possible to attain within a short time a very accurate alignment of core 14 and mold parts 15 to 17 relative to each other and without requiring any subsequent adjustments during the opening and closing movements of the mold.

After the mold has thus been finally assembled, the plastic material is injected into the closed mold from the injection head 18 through an inclined bore 47 which is provided in cover 13 or in a compensating member 25 which is inserted into the cover. By providing this bore 47 in the mold part 17 and cover 13 or in the compensating member 25 at a suitable inclination, it is possible to adjust the sprue opening of the respective mold to the proper level relative to the fixed level of the injection head.

The operation of the hydraulic piston 39 is preferably controlled electrically in a manner so as to prevent any possible damage of the mold during the operation of the apparatus which may be caused, for example, by a closing of the mold support 9 while the core or last 14 is in the open position.

As already indicated, it is also possible to mount a plurality of the molding apparatus according to the invention on a movable base, for example, on a turntable which is moved intermittently at a present interval so as to carry out a mass production by means of a single injection apparatus and a single injection head 18.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. An apparatus for injection-molding of plastics articles comprising a mold support, said mold support comprising a stationary member, two lateral mold supporting members pivotably connected at one side to said stationary member, a core removably mounted between the other side of said lateral members and adapted to be rigidly connected to said stationary member, said core comprising two separate parts, the first of said core parts having a projection rigidly connecting said part to said stationary member, the second part being slidable along said first part, a thrust rod, a toggle joint pivotably connecting said second core part to one end of said thrust rod, a piston slidable within said stationary member for moving said two core parts relative to each other, said piston having two separate parts spaced from each other and each having inclined guiding projections extending toward but spaced laterally from each other, and guide rollers rotatably mounted on said thrust rod near the other end thereof and adapted to engage with said inclined projections of said piston parts, a cover pivotably connected at one side to one of said lateral members, means for pivoting said lateral members relative to each other and to said core, closing means for pivoting said cover to close the other side of said lateral members when said members are in the closed position, mold parts removably secured to said lateral members and said cover, means on said lateral members to engage against stop surfaces on said stationary member when said lateral members are in the closed position relative to said core, and an injection head adapted to be connected from the outside to said cover for injecting a plastic material through at least one channel in said cover to the inside thereof.

2. An apparatus for injection-molding of plastics articles comprising a mold support, said mold support comprising a stationary member, two lateral mold supporting members pivotably connected at one side to said stationary member, a core removably mounted between the other side of said lateral members and adapted to be rigidly connected to said stationary member, a cover pivotably connected at one side to one of said lateral members, means for pivoting said lateral members relative to each other and to said core, closing means for pivoting said cover to close the other side of said lateral members when said members are in the closed position, said closing means comprising a toggle-lever lock connected to the other side of said cover and adapted to engage with a counterpart on the other lateral member for locking said cover, said cover having an inclined surface adapted to press upon said other lateral member when said cover is closed so as to close said two lateral mold supporting members tightly around said core, mold parts removably secured to said lateral members and said cover, a pair of laterally spaced stop surfaces fixed to said stationary member outside said lateral mold supporting members, means on said lateral members to engage against said stop surfaces on said stationary member when said lateral members are in the closed position so as then to maintain said lateral members in a fixed position relative to said core, and an injection head adapted to be connected from the outside to said cover for injecting a plastic material through at least one channel in said cover to the inside thereof.

3. An apparatus for injection-molding of plastics articles comprising a mold support, said mold support comprising a stationary member having a vertical tubular shaft, two lateral mold supporting members pivotably connected at one side to said shaft, a core removably mounted between the other side of said lateral members, said core comprising two separate parts, one of said core parts being rigidly connected to said stationary member, a piston slidable within said tubular shaft and operatively connected to the other of said core parts for moving said other core part relative to said one core part, a cover pivotably connected at one side to one of said lateral members, means for pivoting said lateral members relative to each other and to said core, means for pivoting said cover to close the other side of said lateral members when said members are in the closed position, mold parts removably secured to said lateral members and said cover, means on said lateral members adapted to engage against stop surfaces on said stationary member when said lateral members are in the closed position so as then to maintain said lateral members in a fixed position relative to said core, and an injection head adapted to be connected from the outside to said cover for injecting a plastic material through at least one channel in said cover to the inside thereof.

4. An apparatus for injection molding of hollow plastic articles comprising, in combination, support means; a pair of lateral mold supporting members each pivotally mounted with one end thereof on said support means projecting laterally therefrom and turnable between an open and a closed position; core means mounted on said support means in fixed position projecting laterally therefrom between said pair of lateral mold supporting members; a cover member pivotally connected to the other end of one of said lateral mold supporting members and movable between an open and a closed position; mold parts removably secured to said lateral mold supporting members and said cover member and having each an inner surface portion defining together a mold cavity about said core means when said lateral mold supporting members and said cover member are in said closed position; moving means operatively connected to said lateral mold supporting members and said cover member for moving said members between said open and said closed positions thereof; a pair of stop faces on said support means located laterally of and outside said mold supporting members; a pair of abutment means projecting from and respectively fixed to said lateral mold supporting members and abutting against said stop faces when said lateral mold supporting members are in said closed position thereof for keeping the latter in proper fixed position relative to said core means; and means for injecting plastic material into said mold cavity around said core means.

5. An apparatus for injection molding of hollow plastic articles comprising, in combination, support means including a vertical shaft; a pair of lateral mold supporting members each pivotally mounted with one end thereof on said vertical shaft of said support means projecting laterally therefrom and turnable between an open and a closed position; core means mounted on said vertical shaft of said support means in fixed position projecting laterally therefrom between said pair of lateral mold supporting members; a cover member pivotally connected to the other end of one of said lateral mold supporting members and tiltable about an axis parallel to said vertical shaft between an open and a closed position; mold parts removably secured to said lateral mold supporting members and said cover member and having each an inner surface portion defining together a mold cavity about said core means when said lateral mold supporting members and said cover member are in said closed position; moving means operatively connected to said lateral mold supporting members and said cover member for moving said members between said open and said closed positions thereof; a pair of stop faces on said support means and respectively arranged laterally of and respectively on opposite sides of said vertical shaft outside said mold supporting members; a pair of abutment means projecting from and respectively fixed to said lateral mold supporting members and abutting against said stop faces when said lateral mold supporting members are in said closed position thereof for keeping the latter in proper fixed position relative to said core means; and means for injecting plastic material into said mold cavity around said core means.

6. An apparatus for injection molding of hollow plastic articles comprising, in combination, support means; a pair of lateral mold supporting members each pivotally mounted with one end thereof on said support means projecting laterally therefrom and turnable between an open and a closed position; core means mounted on said support means in fixed position projecting laterally therefrom between said pair of lateral mold supporting members; a cover member pivotally connected to the other end of one of said lateral mold supporting members and movable between an open and a closed position; mold parts removably secured to said lateral mold supporting members and said cover member and having each an inner surface portion defining together a mold cavity about said core means when said lateral mold supporting members and said cover member are in said closed position; a plurality of adjusting means respectively operatively connected to said lateral mold supporting members and said cover member and the mold parts respectively mounted thereon for adjusting the position of said mold parts relatively to said members on which they are mounted; moving means operatively connected to said lateral mold supporting members and said cover member for moving said members between said open and said closed positions thereof; a pair of stop faces on said support means located laterally of and outside said mold supporting members; a pair of abutment means projecting from and respectively fixed to said lateral mold supporting members and abutting against said stop faces when said lateral mold supporting members are in said closed position thereof for keeping the latter in proper fixed position relative to said core means; and means for injecting plastic material into said mold cavity around said core means.

7. An arrangement as defined in claim 6, in which said adjusting means comprises a plurality of wedge shaped plates respectively sandwiched between said members and said mold parts mounted thereon and each formed with elongated apertures therethrough; and screw means extending through said apertures for permitting adjustment of the position of said wedge shaped plates relative to said members and for securing said plates, said members and said mold parts in fixed position to each other after adjusting the position of said plates.

8. An arrangement as defined in claim 6, and including screw means for temporarily securing the mold parts associated with said lateral mold support members in abutting relationship to each other to permit centering of said core means relative to said abutting mold parts before the latter are attached to said lateral mold supporting members and said lateral mold supporting members being formed with apertures permitting removal of said screw means after said mold parts are fixed to said lateral mold supporting members in adjusted position.

References Cited in the file of this patent

UNITED STATES PATENTS

| 2,331,963 | Da Cunha | Oct. 19, 1943 |
| 2,543,679 | Van Riper | Feb. 27, 1951 |

FOREIGN PATENTS

| 1,113,110 | France | Nov. 28, 1955 |
| 1,129,107 | France | Sept. 3, 1956 |
| 563,964 | Italy | June 7, 1957 |
| 581,352 | Italy | Aug. 26, 1958 |

OTHER REFERENCES

British Plastics Article, December 1956, 18–30P., vol. 29, No. 12, pp. 442–3.

German application K 17,588, Dec. 22, 1955.